（12）United States Patent     (10) Patent No.:    US 8,407,518 B2
Nelson et al.                                          (45) Date of Patent:     Mar. 26, 2013

(54) USING VIRTUAL MACHINE CLONING TO CREATE A BACKUP VIRTUAL MACHINE IN A FAULT TOLERANT SYSTEM

(75) Inventors: Michael Nelson, Alamo, CA (US); Daniel J. Scales, Mountain View, CA (US); Andrew Tucker, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 1049 days.

(21) Appl. No.: 12/258,185

(22) Filed: Oct. 24, 2008

(65) Prior Publication Data

US 2009/0113109 A1     Apr. 30, 2009

Related U.S. Application Data

(60) Provisional application No. 60/982,986, filed on Oct. 26, 2007.

(51) Int. Cl.
*G06F 11/00*        (2006.01)
(52) U.S. Cl. .............................................. 714/13; 718/1
(58) Field of Classification Search .................... 714/13, 714/4.1, 4.11, 6.1, 6.2, 6.3, 6.31, 10–12, 714/15; 718/1; 711/6
See application file for complete search history.

(56) References Cited

U.S. PATENT DOCUMENTS

| | | | |
|---|---|---|---|
| 6,625,751 B1 * | 9/2003 | Starovic et al. ................. | 714/11 |
| 7,093,086 B1 * | 8/2006 | van Rietschote ............ | 711/161 |
| 2004/0010787 A1 * | 1/2004 | Traut et al. ......................... | 718/1 |
| 2006/0101189 A1 * | 5/2006 | Chandrasekaran et al. ...... | 711/6 |

OTHER PUBLICATIONS

C. Clark, K. Fraser, S. Hand, J. G. Hansen, E. Jul, C. Limpach, I. Pratt, and A. Warfield. "Live Migration of Virtual Machines." In Proceedings of the 2nd Symposium on Networked Systems Design and Implementation (NSDI), May 2005, pp. 273-286.*
Constantine P. Sapuntzakis, et al., "Optimizing the Migration of Virtual Computers," USENIX, Proceedings of the 5th Symposium on Operating Systems Design and Implementation, Boston, Massachusetts, USA, Dec. 2002.
Michael Nelson, et al., "Fast Transparent Migration for Virtual Machines," 2005 USENIX Annual Technical Conference, Palo Alto, California, USA, pp. 391-394, 2005.
Dejan S. Milojicic, et al., "Process Migration," ACM Computing Surveys, vol. 32, No. 3, pp. 241-299, Sep. 2000.
Marvin M. Theimer, et al., "Preemptable Remote Execution Facilities for the V-System," Association for Computing Machinery, pp. 2-21, Dec. 1985.

* cited by examiner

*Primary Examiner* — Scott Baderman
*Assistant Examiner* — Joseph Kudirka (57) ABSTRACT

Techniques for creating a fault tolerant system in a virtual machine environment utilize a primary VM and a backup VM. To initialize the fault tolerant system, the backup VM and primary VM start from the same state. To achieve this in one embodiment, the primary VM is suspended and the state of the primary VM is copied to the backup VM. Once the backup VM has received all the primary VM's state, the primary VM is resumed. Subsequent state changes of the primary VM are buffered until the backup VM resumes, connects to the primary VM, and starts consuming the buffered content. Thereafter, synchronization is maintained by the primary VM's writing relevant state changes to a log and the backup VM's reading such relevant state changes from the log.

25 Claims, 4 Drawing Sheets

USING VIRTUAL MACHINE CLONING TO CREATE A BACKUP VIRTUAL MACHINE IN A FAULT TOLERANT SYSTEM

This application claims the benefit of U.S. Provisional Application No. 60/982,986 filed Oct. 26, 2007, which provisional application is incorporated herein by reference in its entirety.

CROSS-REFERENCE TO RELATED APPLICATIONS

This application relates to commonly owned U.S. patent application Ser. No. 12/184,134 filed Jul. 31, 2008.

FIELD OF THE INVENTION

This subject disclosure relates to a computer architecture, in particular, to a fault tolerant computer architecture that coordinates operation of multiple virtual machines.

BACKGROUND

The advantages of fault-tolerant computing have become widely recognized. Among these advantages is an ability to maintain duplicate sets of data and resources in the event of a system crash or corruption, thereby preventing an entire system from being lost due to failure of one or more components. Such systems are common in medical, navigational, military and real-time processing systems. However, the implementation of fault tolerant systems in a virtual machine environment creates special challenges. In order to more fully appreciate these challenges, a discussion of virtual machine technology is appropriate.

Figure 1:
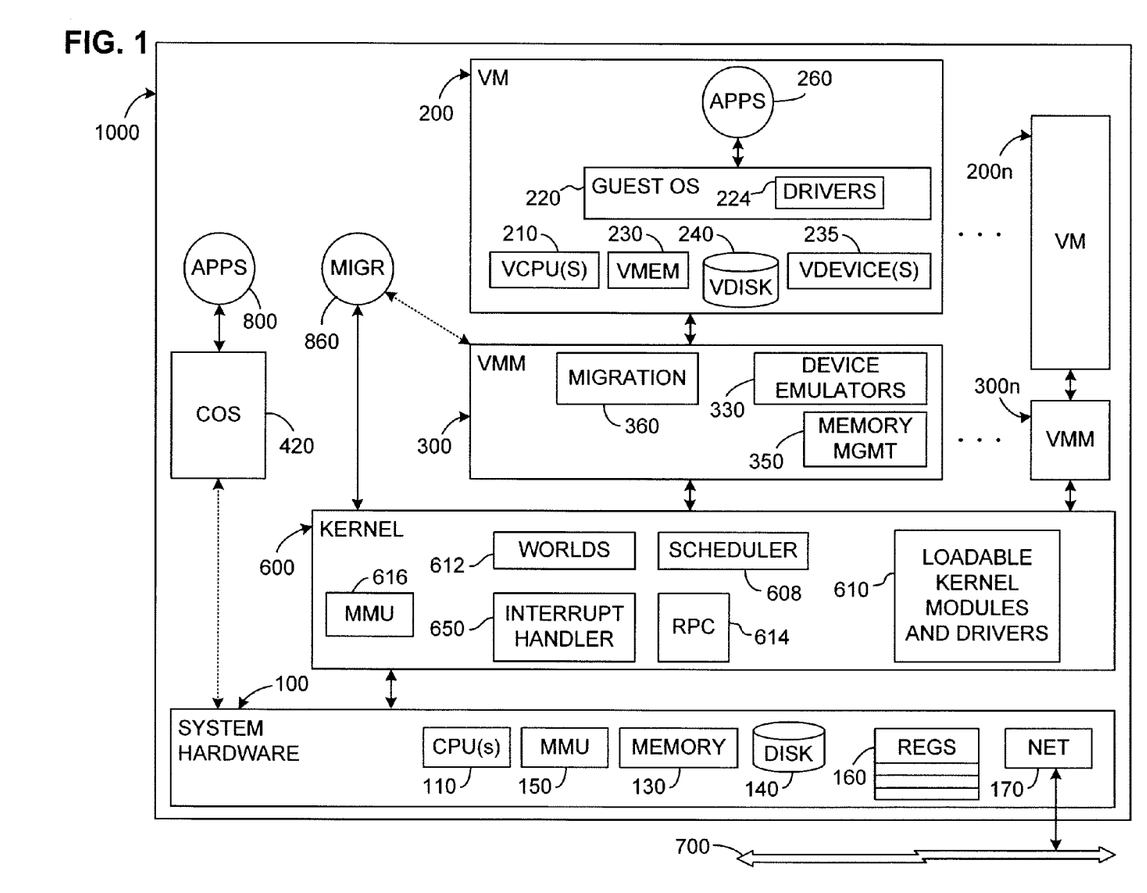
FIG. 1 illustrates the main components of a server that includes one or more virtual machines (VMs) running on a system-level kernel.

Virtual machine technology provides an ability to run multiple virtual machines on a single host platform. This makes better use of the capacity of the hardware, while still ensuring that each user enjoys the features of a "complete," isolated computer. As is well known in the field of computer science, a virtual machine (VM) is a software abstraction—a "virtualization"—of an actual physical computer system. FIG. 1 illustrates, in part, a general configuration of virtual machine 200 which is installed as a "guest" on "host" hardware platform 100. As FIG. 1 shows, hardware platform 100 includes one or more processors (CPU's) 110, system memory 130, and a storage device, which will typically be a disk (disk 140). The system memory will typically be some form of high-speed RAM, whereas the disk (one or more) will typically be a non-volatile, mass storage device. Hardware 100 will also typically include other conventional mechanisms such as memory management unit (MMU) 150, various registers 160, and any conventional network connection device 170 (such as a network adapter or network interface card—"NIC") for transfer of data between.

Each VM 200 will typically include at least one virtual CPU 210, virtual disk 240, virtual system memory 230, guest operating system 220 (which may simply be a copy of a conventional operating system), and various virtual devices 235, for which the guest operating system ("guest OS") will include corresponding drivers 224. All of the components of the VM may be implemented in software using known techniques to emulate the corresponding components of an actual computer.

Typically, it will not be apparent to a user that any applications 260 running within the VM are running indirectly, that is, via the guest OS and virtual processor. Applications 260 running within the VM will act just as they would if run on a "real" computer, except for a decrease in running speed that may be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU) which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes all the resources of the machine. Among other components, the VMM usually includes device emulators 330 which may constitute the virtual devices (235) that VM 200 addresses. The interface exported to the VM is such that the guest OS cannot determine the presence of the VMM. The VMM also usually tracks and either forwards (to some form of operating system) or itself schedules and handles all requests by its VM for machine resources, as well as various faults and interrupts.

Although the VM (and thus the user of applications running in the VM) cannot usually detect the presence of the VMM, the VMM and the VM may be viewed as together forming a single virtual computer. They are shown in FIG. 1 as separate components for the sake of clarity.

In some systems, such as a Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations of behalf of the VM. The virtual computer in this configuration is fully hosted in that it runs on an existing host hardware platform and together with an existing host OS. In other implementations, a dedicated kernel takes the place of and performs the conventional functions of the host OS, and virtual computers run on the kernel. FIG. 1 illustrates kernel 600 that serves as the system software for several VM/VMM pairs 200/300, . . . , 200n/300n. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. An ESX Server product of VMware, Inc. has such a configuration. A kernel-based virtualization system of the type illustrated in FIG. 1 is described in U.S. patent application Ser. No. 09/877,378 ("Computer Configuration for Resource Management in Systems Including a Virtual Machine"), now U.S. Pat. No. 6,961,941, which is incorporated here by reference. The main components of this system and aspects of their interaction are, however, outlined below.

Except for network 700, the entire multi-VM system shown in FIG. 1 can be implemented in a single physical machine, such as a server. This is illustrated by single functional boundary 1000. Of course devices such as keyboards, monitors, etc., will also be included to allow users to access and use the system, possibly via network 700; these are not shown merely for the sake of simplicity.

For purposes of understanding the above-described virtual machine technology, the following should be borne in mind. First, each VM 200, ..., 200n has its own state and is an entity that can operate completely independently of other VMs. Second, the user of a VM, in particular, of an application running on the VM, will usually not be able to notice that the application is running on a VM (which is implemented wholly as software) as opposed to a "real" computer. Third, assuming that different VMs have the same configuration and state, the user will not know and would have no reason to care which VM he/she is currently using. Fourth, the entire state (including memory) of any VM is available to its respective VMM, and the entire state of any VM and of any VMM is available to kernel 600. Finally, as a consequence of the above, a VM is "relocatable."

Co-pending U.S. patent application Ser. No. 09/497,978, filed 4 Feb. 2000 ("Encapsulated Computer System"), now U.S. Pat. No. 6,795,966, which is incorporated herein by reference, discloses a mechanism for checkpointing an entire state of a VM. When a VM is suspended, all of its state (including its memory) is written to a file on disk. A VM can then be migrated by suspending the VM on one server and resuming it, for example, via shared storage on another server.

Note that the execution of a VM is frequently suspended even though it is "running." A VM may be suspended, for example, to allow execution of another co-running VM to proceed. Suspending the VM long enough to transfer its non-memory state is therefore not inconsistent with the notion that it is still running. Suspension for the purpose of non-memory state transfer contrasts however, with powering down or "shutting off" the VM, which is a software mechanism that virtualizes the power-down procedure of a physical machine. For example, suspension does not necessarily lead to loss of cached data, whereas powering-off typically does. Similarly, resumption of execution after a suspension does not require such time-consuming tasks as rebooting the OS, whereas powering back on ("restarting") typically does.

As an improvement to the suspend and resume technique cited above, U.S. patent application Ser. No. 10/319,217, entitled "Virtual Machine Migration", which is commonly assigned, and which is hereby incorporated herein by this reference, describes methods that may be used to allow a running VM to be moved between physical hosts. With the system and techniques described therein, a VM to be moved is allowed to keep running until most of its physical memory has been copied to the destination host. Once the VM's memory is copied, it is paused while the rest of its state is saved and sent to the destination host. Once the destination host has received all the VM's state, the VM is resumed on the destination host and terminated on the source host. A product which embodies the functionality described in the above-identified patent application is VMware's VMotion commercially available from VMware, Inc., Palo Alto, Calif. 94304, and is included in VMware Infrastructure Enterprise Edition or can be purchased as an add-on product to the Standard and Starter editions.

SUMMARY OF THE INVENTION

In accordance with one or more embodiments of the present invention, a fault tolerant system in a virtual machine (VM) utilizes a primary VM and a backup VM which are kept in a synchronized state by the primary VM's writing relevant state changes to a log and the backup VM's reading such relevant state changes from the log. To initialize the system, the backup VM and the primary VM start from the same state.

In a virtual machine environment that utilizes shared storage, the state of the primary VM executing on a primary machine is copied to the backup machine upon which the backup VM is executing by a technique called VM cloning that, in accordance with one or more embodiments, may be implemented using VMware's VMotion technology. And, once the backup machine has received all the primary VM's state, the primary VM continues execution. All state changes of the primary VM on the primary machine are buffered until the backup VM on the backup machine resumes, connects to the primary VM, and starts consuming the log. The primary VM can continue execution even before the backup VM has resumed. In this manner, the primary VM is only paused long enough to copy its non-memory state to the destination machine.

According to one aspect of the present invention, a computer program product and method for providing fault tolerance in a virtual machine environment comprise program code and processes for: (a) initiating execution of a primary VM and a backup VM from the same state information; and (b) providing the backup VM with access to subsequent changes in the state information made by the primary VM while the primary VM and backup VM execute in near lockstep. In another embodiment, (b) further comprises any of writing state changes of the primary VM to a log and/or reading the log entries by the backup VM. In yet another embodiment, (b) further comprises maintaining a network connection between the primary VM and backup VM over which the changes to the state information are communicated.

DETAILED DESCRIPTION

We have discovered that: (a) a need exists in a fault tolerant system for an ability to launch a backup VM from the same state data as a primary VM execution; (b) a need also exists for an ability to quickly launch a backup VM since a system is not fault-tolerant while a launching process is occurring; (c) a need also exists for an ability to launch a backup VM in a fault tolerant system virtual machine environment that can be kept in synchronization with a primary VM; and (d) a need also exists in a fault tolerant system for an ability to launch a backup VM with minimal disruption to the primary VM's execution.

Figure 2:
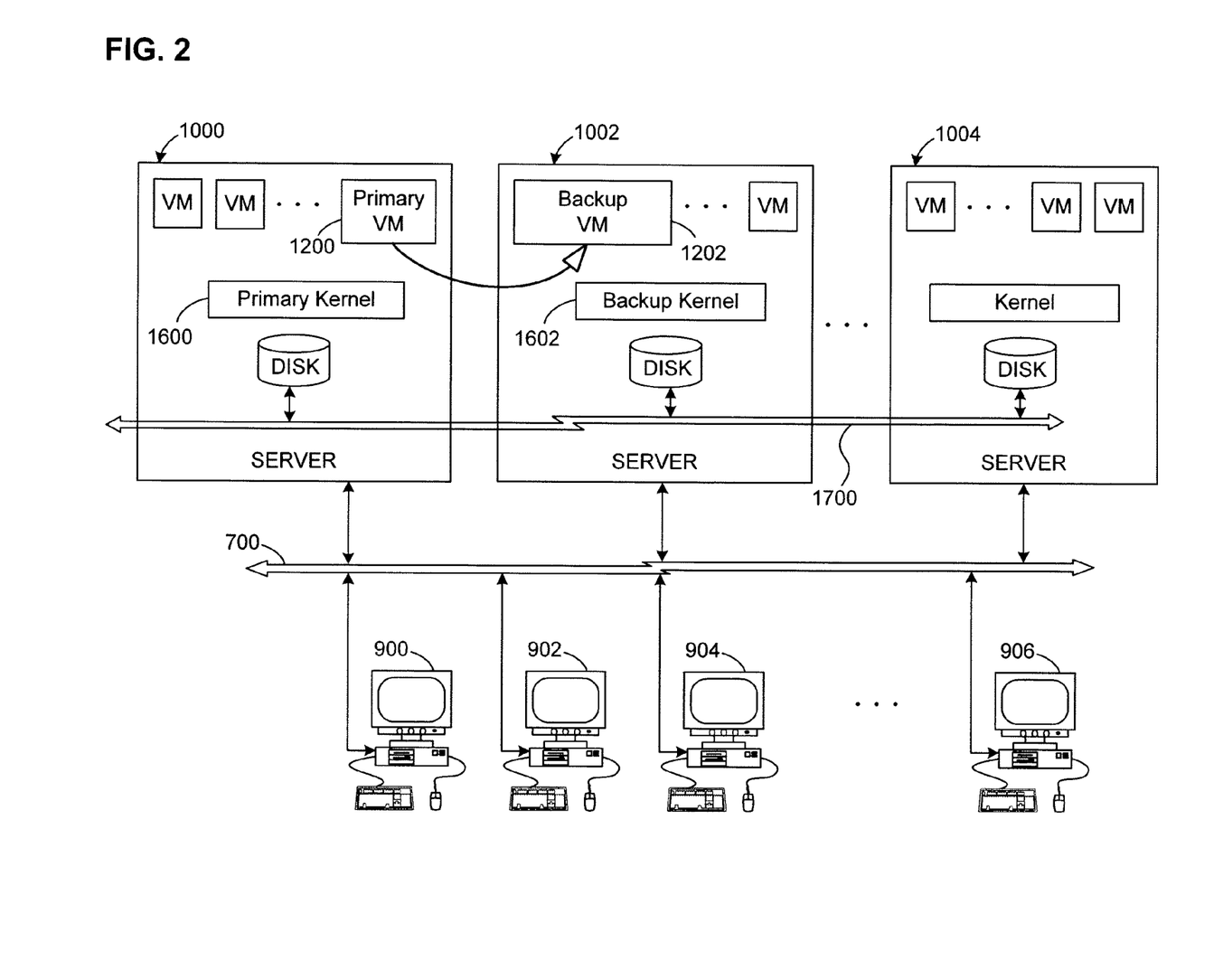
FIG. 2 illustrates a plurality of interconnected servers, with each server hosting a plurality of VMs.

An exemplary virtual machine environment in which processes disclosed herein may be implemented are described in conjunction with FIGS. 1-2. As shown in FIG. 2, a plurality of users 900, 902, 904, ..., 906 access a plurality of servers 1000, 1002, ..., 1004 via network 700. Each of the servers may be configured as server 1000 shown in FIG. 1, and may host one or more virtual machines (VMs), as well as mechanisms for cloning a source VM from one server (a primary server) to a destination VM (a backup server) while the primary VM is still running, using one or more methods described herein. The servers in FIG. 2 may be arranged in a server farm in which all of the resources of all of the machines in the farm can be aggregated into one common resource pool. From the perspective of a user, the farm will appear to be one big machine with lots of resources.

A first illustrative embodiment of the present invention makes two assumptions which simplify its implementation. However, further embodiments of the present invention are not restricted to these two assumptions. In fact, in light of this description, it will be clear to those of ordinary skill in the art how to fabricate further embodiments which avoid the need for these assumptions. The first assumption is that VMs will only be cloned between machines that share storage where the VMs' disks reside. This first assumption eliminates a need to copy or mirror entire disks. To allow for inter-server cloning, servers 1000, 1002, . . . , 1004 shown in FIG. 2 therefore either share an external, common storage system or they can access each other's internal storage. One way to arrange this is for all servers in the farm to be connected via a system such as, for example and without limitation, Fibre Channel; this arrangement is illustrated in FIG. 2 with the servers in the farm being connected via channel 1700. The second assumption is that VMs are only cloned between machines whose network adapters are on the same subnet that is being used by the primary VM.

Figure 3:
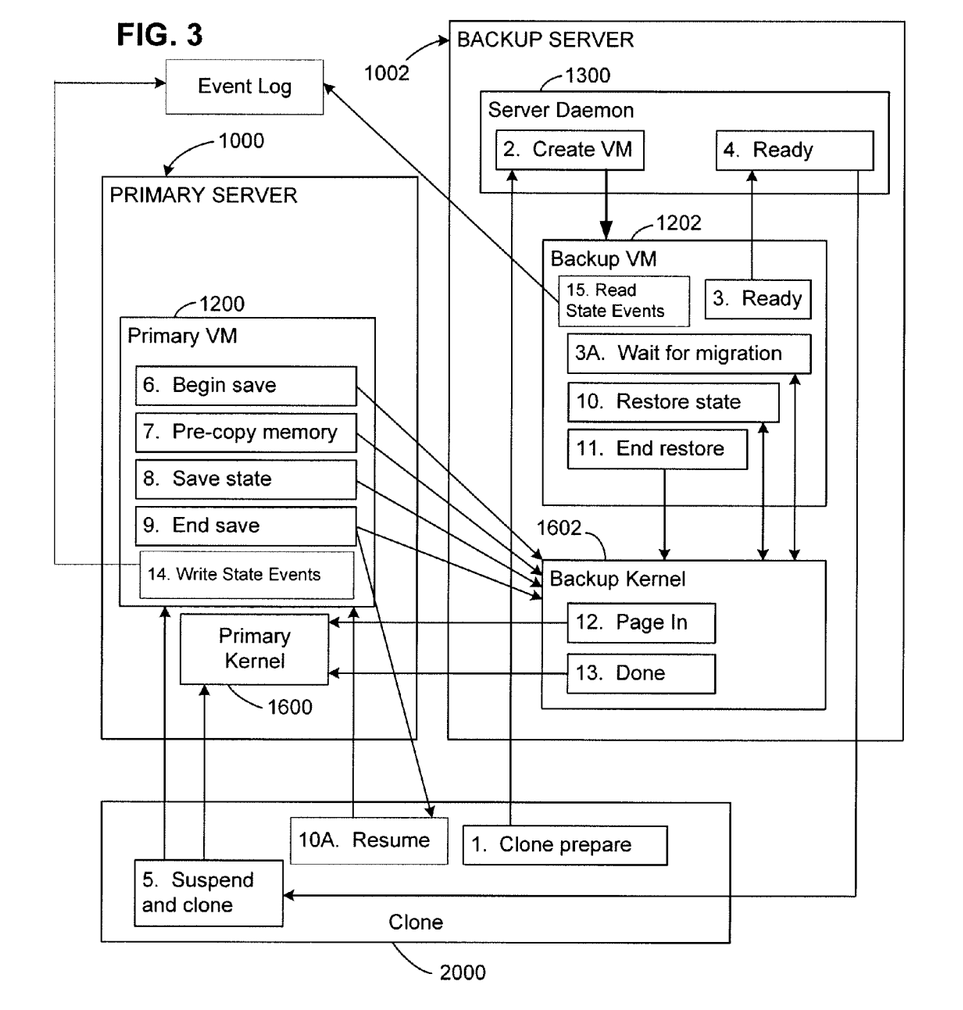
FIG. 3 is a structural flowchart that shows both operations and components involved in cloning a VM from a primary host to a backup host according to a first illustrative embodiment of the present invention.

FIG. 3 is a structural flowchart that shows both operations and components involved in cloning a VM from a primary host to a backup host according to a first illustrative embodiment of the present invention. In FIG. 3, the various operations or procedural activities are numbered.

In FIGS. 2 and 3, VMMs for each VM are not shown for the sake of simplicity. The VM can be transferred without requiring any transfer of state information about its respective VMM, and the VMM is transparent to the VM. Nonetheless, for the sake of simplicity, when it is stated below that the VM performs a certain cloning-related action, it is to be understood that instructions for performing such an action are preferably not part of the VM's instructions or code (in order to maintain transparency). Rather, the cloning code may be located in any of several components that are external and transparent to the VM being cloned. In one embodiment, the cloning code may be included within the VMM (refer to migration module 360 shown in FIG. 1), which cloning code interacts, for example and without limitation, with a dedicated user-level application (refer to MIGR 860 shown in FIG. 1) configured as in the VMware Workstation product mentioned above. There are several entities involved in cloning, each of which is a software module, that is, a set of computer instructions, that will execute on the processor(s) of the respective server, including a clone initiator, a service process or "daemon," a primary VM, a backup VM, and a kernel. In one embodiment, the clone initiator may be formed of cooperating software modules within the VMM of the VM to be cloned and a dedicated user-level application (for example, MIGR 860 shown in FIG. 1).

In FIG. 3, the initiator is shown as being located in a general cloning sub-system 2000 which may be included in whatever component(s) a software designer uses for a given implementation.

As shown in FIG. 3, a service process (server "daemon" 1300) runs on the destination server (backup server 1002 shown in FIG. 3) and is capable of configuring and starting up a destination VM (backup VM 1202 shown in FIG. 3). Such daemons are found in existing virtualization systems such as those commercially available from VMware, Inc. As shown in FIG. 3, primary VM 1200 is running on primary server 1000 and is being cloned to the destination server (backup server 1002 shown in FIG. 3) and backup VM 1202 running on backup server 1002 will be the clone. The kernel (or equivalent system software) of the destination or backup server (i.e., backup kernel 1602 shown in FIG. 3) and the kernel (or equivalent system software) of the source or primary machine (i.e., primary kernel 1600 shown in FIG. 3) can be implemented in accordance with one or more embodiments of the present invention as described herein.

Cloning Procedures

As mentioned above, in accordance with one or more embodiments of the present invention, no VM needs to include code to perform any of the operations or actions involved in the cloning process. Rather, such code may be located in the VM's respective VMM or some other user- and/or system-level software component(s). In FIG. 3, various cloning operations or actions are shown within the primary (source) and backup (clone) VMs merely for the sake of illustration.

In accordance with one or more embodiments of the present invention, a fault tolerant system in a virtualized computer system utilizes a primary VM and a backup VM wherein the two VMs are kept in a synchronized state by the primary VM's writing relevant state changes to a log and the backup VM's reading such relevant state changes from the log. To initialize the fault tolerant system, the primary VM and the backup VM start from the same state. In a virtual machine environment that utilizes shared storage, VM cloning, which, in the illustrative embodiment, utilizes VMware's VMotion technology, can be used to speed up creation of the backup VM and minimize disruption to the primary VM. Unlike a migration process, where the primary VM is terminated after the migration completes, in a cloning process, the primary and backup (or destination) VMs both continue to run after the cloning process completes. For the backup (or cloned) VM to be of value as a fault tolerant back-up of the primary VM, both the primary and the backup VMs start from the same state and are kept in a synchronized state utilizing the system and techniques described herein. Once the destination host has received all the primary VM's state, the primary VM on the source machine is continued and becomes the primary VM. All state log entries of the primary VM on the source machine are buffered until the backup VM on the destination machine resumes, connects to the primary VM and starts consuming the log. In this manner, the primary VM is only paused long enough to copy the non-memory state to the destination machine. The primary VM can continue execution even before the backup VM has resumed.

In accordance with the illustrative embodiment, the primary VM's entire state, both memory and non-memory state, is copied to the backup VM. Rather than just suspending the primary VM and copying its entire state to the backup VM, the memory state is pre-copied first, while the primary VM is still running. Then the primary VM is suspended, and the non-memory state is copied. This technique is described below with reference to FIG. 3.

In the initial step (refer to Step 1 of FIG. 3), an initiating sub-system within clone component 2000 requests the creation of a backup VM. To minimize the down time for running primary VM 1200 during the cloning process, backup VM 1202 is created and put into a wait state before primary VM 1200 begins a clone operation. Upon receipt of any suitable initiation signal and parameters from the sub-system within component 2000, backup VM 1202 is created (refer to Step 2 of FIG. 3) by a service, for example and without limitation, server daemon 1300, that runs on the backup machine (backup server 1002). As is mentioned above, such VM creation routines are found in existing virtualization systems; any such known routine may be used in embodiments of the present invention. Once backup VM 1202 is created, its VMM informs server daemon 1300 that it is ready to accept a clone (refer to Step 3 of FIG. 3). Server daemon 1300 then calls into backup kernel 1602 to notify it that state information can be transferred from primary VM 1200—backup kernel 1602 will return an error if no state is available to be restored. Backup VM 1202 expects this, and, as part of waiting for a clone (refer to Step 3A of FIG. 3A), keeps retrying until backup kernel 1602 is ready to begin restoring the state. Server daemon 1300 also indicates to other components (for example, primary kernel 1600, backup kernel 1602, and/or general cloning component 2000) that backup VM 1202 is ready for a clone (Step 4).

Once backup VM 1202 is ready, clone component 2000 indicates to the primary VMM and/or primary kernel 1600 that primary VM 1200 should be suspended long enough (using known techniques) that its non-memory state information can be transferred to and saved in backup VM 1202 and that the cloning process should begin (refer to Step 5 of FIG. 3). Note that a non-memory state transfer will usually be a relatively fast operation compared with transferring the primary VM's memory, so that the primary VM's suspension should not be so long that it inconveniences a user. Primary VM 1200 (that is, its VMM) first interacts with backup kernel 1602 to signal backup kernel 1602 to prepare to accept the primary VM's saved non-memory state (refer to Step 6 of FIG. 3). The transfer of the saved state may be carried out using any known technology such as, for example and without limitation, over a TCP/IP connection. If asynchronous memory transfer is implemented, the primary VM's memory may also be pre-copied (refer to Step 7 of FIG. 3) to the backup machine while primary VM 1200 is still running using a method or technique described below. After the memory pre-copy operation finishes, primary VM 1200 is suspended (using known techniques). Then, the primary VM's non-memory state is saved in the backup (refer to Step 8 of FIG. 3). After all the primary VM's non-memory state information has been saved to the backup, primary VM 1200 (again, meaning its VMM) sends a message to backup kernel 1602 informing it that non-memory state transfer has completed (refer to Step 9 of FIG. 3) and that backup VM 1202 can now begin restoring itself (refer to Step 10 of FIG. 3), that is, loading the saved non-memory state information and executing backup VM 1202 from the restored state. Primary VM 1200 also sends a similar message to clone component 2000 informing it that the state transfer has completed. In response, clone component 2000 instructs the primary VMM and/or primary kernel 1600 that primary VM 1200 should be resumed from its point of suspension and that all subsequent state entries should be buffered (refer to Step 10A of FIG. 3). When the non-memory state information is fully restored within backup VM 1202 (refer to Step 11 of FIG. 3), backup VM 1202 will be functionally identical to primary VM 1200 as of the point of suspension, except possibly for the primary VM's memory.

The physical memory of primary VM 1200, that is, the contents of virtual memory 230 (refer to FIG. 1), which primary VM 1200 views as physical memory, is either transferred while primary VM 1200 is still running or the backup machine (for example, backup kernel 1602) pages it in after backup VM 1202 starts running. The specification discloses two different methods to clone the memory of primary VM 1200, both of which involve paging in from the memory of primary VM 1200 (refer to Step 12 of FIG. 3), either on demand or asynchronously, any pages not already copied to the backup, until all the memory pages of primary VM 1200 have been transferred to the backup (refer to Step 13 of FIG. 3). One method is for the backup machine to demand page in all memory over the network after backup VM 1202 has started. In other words, a page of memory from primary VM 1200 is transferred to backup VM 1202 whenever backup VM 1202 needs and requests it.

Alternatively, as much memory as possible is transferred asynchronously while primary VM 1200 is running using the following method. A thread is created, preferably in the primary VM's VMM, whose job it is to push or pre-copy all of the memory of primary VM 1200 memory over to the backup machine. The thread then iterates through all physical pages and does the following: (a) a PPN (physical page number) associated with a physical page is write-protected by the primary VMM, using known procedures, which procedures may be included in memory management module 350 (refer to FIG. 1); and (b) the thread writes the page over to backup kernel 1602.

If any of pages that were transferred are modified (the VMM detects this because a write-protect fault will be taken on the page), then the page is marked as modified. Marking may be done as simply—and compactly—as setting a bit in a table (or vector) for the modified page. Once all pages have been transferred, a list of modified pages is then sent to backup kernel 1602 so it knows that these pages need to be paged in from the primary. Note, once execution of backup VM 1602 has started, the first time backup VM 1602 touches any page that has not been copied to the backup machine since it was last modified, it will send a message to the primary machine that generates a network page fault; this fault is then used as a signal to immediately transfer the needed page.

According to another method, it is also possible to pre-copy the memory of primary VM 1200 to the backup "iteratively," that is, over multiple "passes," before the non-memory state is transferred. According to this iterative memory transfer method, a first set (preferably all) of pages of the memory of primary VM 1200 is pre-copied to backup VM 1202. During the time the memory is being transferred, however, primary VM 1200, which is allowed to continue running, may modify some of the transferred pages. Modifications to the memory of primary VM 1202 memory may be detected and tracked using any known method, such as a write-protection mechanism or a separate table indicating memory modifications. These modified pages are then re-transferred to the backup. While they are being transferred, however, primary VM 1200 may modify other pages (or even modify a previously modified page again). The newly modified pages are then retransferred.

The system repeats the iterative memory transfer method until the number of pages left to be transferred is less than some threshold or the system notices that no forward progress is being made (no reduction in the number of newly modified pages still to be transferred). The threshold (which may be zero), may be determined as an absolute or relative number of pages, either ahead of time, or according to any known adaptive routine.

Each subsequent iteration should take less time because fewer pages will need to be transferred; the transfer process should therefore converge towards a number of modified pages that is small enough that the pages can be transferred rapidly. Any newly modified pages remaining to be copied over after the threshold has been reached may then be transferred after primary VM 1200 is suspended and before non-memory state is copied over; alternatively, these remaining pages may be paged in by backup VM 1202 either on demand or asynchronously after primary VM 1200 is suspended and backup VM 1202 is resumed from the suspended primary state.

Depending on the number of pages that are modified by primary VM 1200 while the preparation phase is being executed (see above), this pre-copying solution (iterative or not) may significantly reduce the number of network page faults needed after backup VM 1202 is resumed. This will in turn improve performance as well as shorten the time required for the background paging thread to get all of the memory over to the backup machine.

The pre-copying approach has a couple of disadvantages, however. First, it increases the time it takes to completely clone a VM—the VM cannot be cloned until all of its memory has been copied over to the backup machine. Second, it requires that more memory be transferred than the first approach—any pages that are modified after they are transferred will have to be transferred twice. A designer of embodiments of the present invention may decide which method—demand paging or pre-paging or a hybrid of both—to include by following known design considerations.

As is mentioned above, an assumption of the first illustrative embodiment of the present invention is that primary server 1000 and backup server 1002 share the storage where primary VM 1200 and backup VM 1202 disks reside. This arrangement greatly speeds up the transfer process since it eliminates the need to migrate entire disks. However, the disclosed methods do not require a common server storage system. In such cases, the virtual disk may be transferred using the same techniques as are described above for memory transfer, that is, using on-demand and/or asynchronous page (or sector or track, etc.) transfer from the virtual disk of primary VM 1200 to the virtual disk of backup VM 1202. In addition, the pre-copying techniques used for memory transfer are applicable to disk transfer as well—the disk data can be transferred while primary VM 1200 is still running and any modified disk blocks (or similar units) can then be fetched by backup VM 1202 after it is restored, either all at once or iteratively.

Once all the state, including the memory, is transferred using the methods or techniques described herein, backup VM 1202, or rather, an exact copy of primary VM 1200, will be installed in backup server 1002 and will function exactly as primary VM 1200 since the resumed point of execution for primary VM 1200 and the initial point of execution for backup VM 1202 were from the same state information. As such, synchronization is achieved between both VMs during subsequent simultaneous execution as long as state entries from primary VM 1200 are similarly accessible to backup VM 1202. To maintain synchronization, all state log entries of primary VM 1200 on the source machine (primary server 1000) are written to a log buffer memory following resumption of execution of primary VM 1200 following its suspension (refer to Step 14 of FIG. 3). Upon initial execution, backup VM 1202 connects to primary VM 1200, and starts consuming (reading) the contents of log 1605 (refer to Step 15 of FIG. 3).

In the illustrative embodiment, log 1605 may be implemented with a thread of execution running within primary VM 1200 or primary kernel 1600 that writes state entries, such as interrupts, keystrokes, network packets, etc., to a memory location and transmits the same over a network connection to backup VM 1202. In the illustrative embodiment, the network connection between primary VM 1200 and backup VM 1202 may be implemented with a TCP IP network socket or equivalent mechanism. Similarly, a corresponding thread of execution running within backup VM 1202 or backup kernel 1602 receives such state data from the network connection and writes the same to a memory for use by backup VM 1202. It will be clear to those reasonably skilled in the relevant arts that other implementations of the log may be utilized including shared memory files, shared disk files, etc. as long as backup VM 1202 has access to the state information of primary VM 1200 to maintain synchronization therewith. In addition, log memory may be implemented with any of shared memory, disk, or network. In one embodiment, the log entries are sent out to the network from a log buffer, since primary server 1000 and backup server 1002 are different physical hosts with no shared memory.

ALTERNATIVE EMBODIMENT(S)

The creation of a fault tolerant system, as contemplated herein, is not limited to scenarios in which the primary VM and the backup VM have shared storage. According to an alternate embodiment, VM cloning technology also can be used in a fault tolerant configuration without shared storage. In such an embodiment, storage as well as the primary VM's state are copied. The storage can be copied using methods similar to those used for copying the physical memory described herein.

Figure 4:
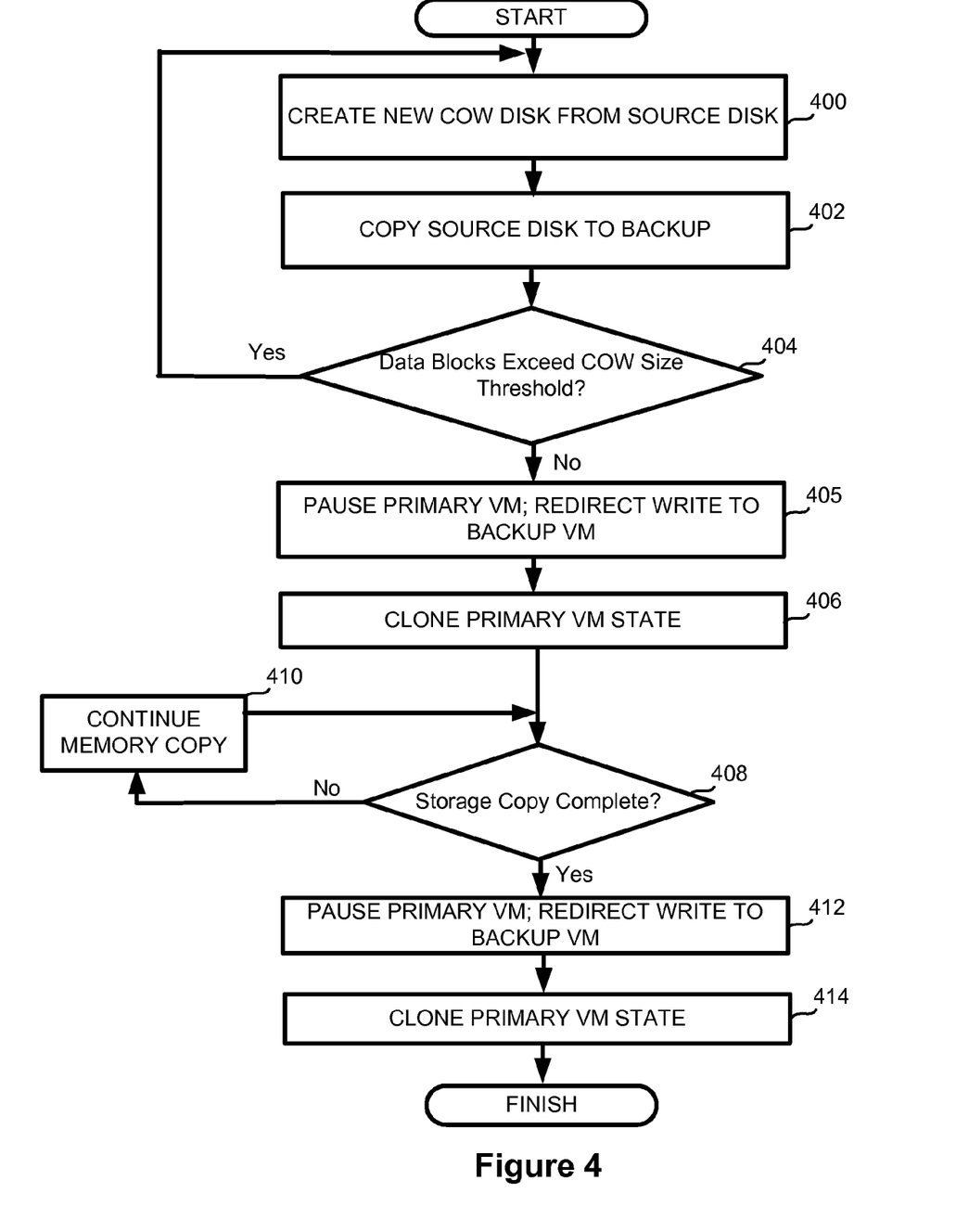
FIG. 4 illustrates a flowchart of a process in accordance with one embodiment of the present invention to clone a VM machine from a primary host to a backup host without shared storage.

FIG. 4 illustrates a flowchart of a process in accordance with this alternative embodiment. First, before the memory of the primary VM is copied, a copy of the primary VM's disk is created, as illustrated by process block 400. Such disk may be implemented with a Copy-On-Write ($COW_1$) disk that takes all writes and refers to the original disk (the parent source) for reading all other blocks. The parent disk is then copied to the backup or destination host, as illustrated by process block 402. Once copying of the parent disk is complete, there will be a number of data blocks on the COW disk. Optionally, the number of data blocks on the COW disk is compared to a predetermined threshold value, as illustrated by decisional block 404. If the number of data blocks on the $COW_1$ disc exceeds the predetermined threshold value, a new disk ($COW_n$) can then be created by copying $COW_1$ disk, which then serves as the new parent source disk, also as illustrated by decisional block 400. The data from $COW_1$ disk can be copied to the backup or destination host, also as illustrated by process block 402. This process can be continued iteratively any number of times, as represented by blocks 400-404 in FIG. 4. If the number of data blocks in the latest $COW_n$ disk is equal to or below the predetermined threshold value, then the primary VM may be paused to copy the data or redirect writes to the backup (destination) host, as illustrated by process block 405. Once the copy of the primary VM's storage is close to being complete, the cloning of the primary VM state utilizing methods or techniques described in conjunction with FIG. 3 may be started, the entire process of which is illustrated by process block 406 in FIG. 4.

In systems in which the primary VM and backup VM do not have shared storage, it is contemplated that the process of cloning a primary VM's memory, as would be performed by the VM cloning technology, and the process of copying storage may occur simultaneously, according to the system and methods or techniques disclosed herein. Ideally, the process of memory copying will complete at the same time that the process of storage copying completes. If the memory copy process completes before the storage process copy completes, then copying of memory changes continues until the storage copy completes, as illustrated by decisional block 408 and process block 410. If the memory copying process completes after the storage copying completes, then all disk writes are forwarded to the backup (destination) VM while the memory is still being copied, as illustrated by decisional block 408 and process block 410. Once the cloning process is complete, all of the COW disks that were created on the primary are consolidated back into the parent disk as illustrated in process block 412. Consolidating the disks involves copying all modified disk blocks from the COW copies into the parent disk starting with the first COW disk. Once the consolidation process is complete, all COW disks are removed and all reads and writes go directly to the parent disk.

In instances where fault tolerance is used as part of a disaster recovery strategy, the primary VM and the backup VM may be running in data centers separated by some distance. For example, companies such as EMC, Inc. provide long distance hardware disk mirroring support that can be utilized to provide a different way of copying a disk from the primary location to the backup location. An alternative embodiment to the above described methods or techniques using such hardware support would be as follows. When a backup VM needs to be launched at a remote site, a disk mirror of the primary disk is created at the remote site using the above-mentioned long distance hardware disk mirroring support. At some point, the disk mirror at the remote site will become synchronized with the disk at the primary site. At such time, the primary disk is put into synchronous disk mirroring mode, and a process of using VM cloning to transfer state data from the primary location to the backup location, as described previously, can be started. Once the transfer of state data via VM cloning is complete, the disk mirroring process can be broken because the disk will be kept in synchronization via the record/replay functionality inherent in the described implementation of a fault-tolerant virtual machine environment. With the record/replay technology, the disk can be kept in synchronization without sending any disk blocks from the primary location to the backup location.

In another alternative embodiment of the above described methods or techniques, VM cloning may be achieved without utilizing VMware's Vmotion technology. To start the backup VM and the primary VM from the same state, such an alternative embodiment entails checkpointing the primary VM, copying the checkpoint state to the backup VM's machine, and then resuming the primary VM and the backup VM. The backup VM will then read the state log from the primary VM. In one implementation of this alternative embodiment, the backup VM and the primary VM share storage, as described herein. The primary VM is authorized to both read from and write to the storage devices, while the backup VM is authorized to only read from the storage devices. In the above, checkpointing entails saving the state of the primary VM, typically through writing to a file.

Although inventive concepts disclosed herein have been described with reference to specific implementations, many other variations are possible. For example, the disclosed methods (or techniques) and systems described herein may be used in both a hosted and a non-hosted virtualized computer system, regardless of the degree of virtualization, and in which the virtual machine(s) have any number of physical and/or logical virtualized processors. In addition, embodiments of the present invention may also be implemented directly in a computer's primary operating system, both where the operating system is designed to support virtual machines and where it is not. Moreover, embodiments of the present invention may even be implemented wholly or partially in hardware, for example in processor architectures intended to provide hardware support for virtual machines. Further, embodiments of the present invention may be implemented with the substitution of different data structures and data types, and protocols. Also, numerous programming techniques utilizing various data structures and memory configurations may be utilized to achieve the results of one or more embodiments of the present invention.

In addition to any of the foregoing alternative implementations, embodiments of the present invention may be implemented in either all software, all hardware, or a combination of hardware and software, including program code stored in firmware format to support dedicated hardware. A software implementation of one or more embodiments of the present invention may comprise a series of computer instructions either fixed on a tangible medium, such as a computer readable media, e.g. diskette, CD-ROM, or disks, such other storage systems, or, transmittable to a computer system via a modem or other interface device, such as a communications adapter connected to the network over a medium. Such medium may be either a tangible medium, including but not limited to optical or analog communications lines, or may be implemented with wireless techniques, including but not limited to microwave, infrared or other transmission techniques. The series of computer instructions, whether contained in a tangible medium or not, may embody all or part of the functionality previously described herein with respect to the present invention. Those skilled in the art will appreciate that such computer instructions can be written in a number of programming languages for use with many computer architectures or operating systems and may exist in machine executable format. Further, such instructions may be stored using any memory technology, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that various changes and modifications can be made which will achieve some of the advantages of the present invention without departing from the spirit and scope thereof. In light of this specification, it will be clear to those reasonably skilled in the art that other components performing the same functions may be suitably substituted. Further, the methods in accordance with one or more embodiments of the present invention may be fabricated in either all software implementations, using appropriate processor instructions, or in hybrid implementations which utilize a combination of hardware logic and software logic to achieve the same results.

What is claimed is:

1. In a computer system, a method of providing fault tolerance in a virtual machine environment comprises:
    A) initiating execution of a primary virtual machine (VM) and a backup VM from the same state information, including transferring primary VM memory to the backup VM while the primary VM is executing; and
    B) providing the backup VM with access to subsequent changes in the state information made by the primary VM while the primary VM and backup VM execute simultaneously.

2. The method of claim 1, wherein A) further comprises:
    A1) suspending execution of the primary VM.

3. The method of claim 2, wherein A) further comprises:
A2) transferring non-memory primary VM state information to the backup VM while the execution of the primary VM is suspended.

4. The method of claim 2, wherein A) further comprises:
A2) resuming execution of the primary VM following suspension thereof.

5. The method of claim 3, wherein A) further comprises:
A2) executing the backup VM from the transferred non-memory primary VM state.

6. The method of claim 1, wherein the transferring the primary VM memory to the backup VM while the primary VM is executing comprises:
transferring pages of the primary VM memory to the backup VM before the primary VM is suspended for transfer of non-memory primary VM state information to the backup VM; and
retransferring at least one of the pages of the primary VM memory that has been modified by the primary VM to the backup VM as part of an iteration process or in response to an access of the at least one of the pages by the backup VM.

7. The method of claim 4, wherein the transferring the primary VM memory to the backup VM while the primary VM is executing comprises:
after the backup VM has been initiated, transferring a page of the primary VM memory to the backup VM in response to a demand by the backup VM for the page of the primary VM memory.

8. The method of claim 1, wherein B) further comprises:
B1) writing the subsequent changes in the state information made by the primary VM to a log.

9. The method of claim 8, wherein B) further comprises:
B2) the backup VM reading the state change entries from the log.

10. The method of claim 8, wherein B) further comprises:
B2) maintaining a network connection between the primary VM and backup VM over which subsequent changes in the state information are communicated.

11. The method of claim 8, wherein the log comprises a buffer memory associated with the primary VM.

12. The method of claim 9, wherein the log comprises a buffer memory associated with the backup VM.

13. A non-transitory computer readable medium having program code embodied thereon, the program code comprising:
program code for initiating execution of a primary virtual machine (VM) and a backup VM from the same state information, and for transferring primary VM memory to the backup VM while the primary VM is executing; and
program code for providing the backup VM with access to subsequent changes in the state information made by the primary VM while the primary VM and backup VM execute simultaneously.

14. A method of providing fault tolerance in a virtual machine environment having a primary virtual machine (VM), the method comprising:
initiating execution of a backup VM;
transferring memory of the primary VM to the backup VM while the primary VM is executing;
suspending execution of the primary VM;
transferring non-memory state information of the primary VM to the backup VM;
resuming execution of the primary VM;
following the resuming of execution of the primary VM, writing state changes to a state log associated with the primary VM;
running the backup VM from the transferred non-memory primary VM state; and
following the running the backup VM from the transferred non-memory primary VM state, providing the backup VM with access to the state log entries in the state log.

15. A non-transitory computer readable medium having program code embodied thereon, the program code comprising:
program code for initiating execution of a backup VM;
program code for transferring memory of a primary VM to the backup VM while the primary VM is executing;
program code for suspending execution of the primary virtual machine (VM);
program code for transferring non-memory state information of the primary VM to the backup VM;
program code for resuming execution of the primary VM;
program code for following the resuming of execution of the primary VM, writing state changes to a state log associated with the primary VM;
program code for running the backup VM from the transferred non-memory primary VM state; and
program code for following the running the backup VM from the transferred non-memory primary VM state, providing the backup VM with access to the state log entries in the state log.

16. A fault tolerant virtual machine system comprising:
a primary computer;
a backup computer operatively coupled to the primary computer;
first program logic stored on a computer readable medium for initiating execution of a primary virtual machine (VM) executable on the primary computer, for initiating execution of a backup VM executable on the backup computer from the same state information, and for transferring primary VM memory to the backup VM while the primary VM is executing; and
second program logic stored on the computer readable medium for providing the backup VM with access to subsequent changes in the state information made by the primary VM while the primary VM and backup VM execute simultaneously.

17. The fault tolerant virtual machine system of claim 16, wherein the first program logic further comprises:
program logic for suspending execution of the primary VM.

18. The fault tolerant virtual machine system of claim 17, wherein the first program logic further comprises:
program logic for transferring non-memory primary VM state information to the backup VM.

19. The fault tolerant virtual machine system of claim 17, wherein the first program logic further comprises:
program logic for resuming execution of the primary VM following suspension thereof.

20. The fault tolerant virtual machine system of claim 18, wherein the first program logic further comprises:
program logic for executing the backup VM from the transferred non-memory primary VM state.

21. The fault tolerant virtual machine system of claim 16, wherein the first program logic further comprises:
program logic for transferring pages of the primary VM memory to the backup VM before the primary VM is suspended for transfer of non-memory primary VM state information to the backup VM, and for retransferring at least one of the pages of the primary VM memory that has been modified by the primary VM to the backup VM as part of an iteration process or in response to an access of the at least one of the pages by the backup VM.

22. The fault tolerant virtual machine system of claim 16, wherein the first program logic further comprises:

program logic for transferring, after the backup VM has been initiated, a page of the primary VM memory to the backup VM in response to a demand by the backup VM for the page of the primary VM memory.

23. The fault tolerant virtual machine system of claim 16, wherein the second program logic further comprises:

program logic for writing state changes of the primary VM to a log.

24. The fault tolerant virtual machine system of claim 23, wherein the second program logic further comprises:

program logic for reading the state changes from the log with the backup VM.

25. The fault tolerant virtual machine system of claim 23, wherein the second program logic further comprises:

program logic for maintaining a network connection between the primary VM and backup VM over which subsequent changes in the state information is communicated.

\* \* \* \* \*